US012637968B2

(12) United States Patent
Yu et al.

(10) Patent No.: US 12,637,968 B2
(45) Date of Patent: May 26, 2026

(54) RAPID EXHAUST CATALYST HEATING USING A GLOW PLUG

(71) Applicant: SAUDI ARABIAN OIL COMPANY, Dhahran (SA)

(72) Inventors: Xin Yu, Novi, MI (US); Anqi Zhang, Canton, MI (US); Andrew Baur, Whitmore Lake, MI (US); James Braun, White Lake, MI (US); David Cleary, West Bloomfield, MI (US); Kiran Premchand, Bellingham, WA (US); Luis Del Rio, Ann Arbor, MI (US); Ryan Sturgeon, Rochester Hills, MI (US); Ronald A. Reese, II, Goodrich, MI (US)

(73) Assignees: SAUDI ARABIAN OIL COMPANY, Dhahran (SA); FCA US LLC, Auburn Hills, MI (US)

( * ) Notice: Subject to any disclaimer, the term of this patent is extended or adjusted under 35 U.S.C. 154(b) by 0 days.

(21) Appl. No.: 18/592,380

(22) Filed: Feb. 29, 2024

(65) Prior Publication Data

US 2025/0277464 A1 Sep. 4, 2025

(51) Int. Cl.
*F01N 3/20* (2006.01)
*F01N 3/025* (2006.01)
(Continued)

(52) U.S. Cl.
CPC ........... *F01N 3/204* (2013.01); *F01N 3/2892* (2013.01); *F02D 41/0255* (2013.01);
(Continued)

(58) Field of Classification Search
CPC ........ F01N 3/204; F01N 3/2892; F01N 3/025; F01N 3/0253; F01N 3/0256; F01N 3/26;
(Continued)

(56) References Cited

U.S. PATENT DOCUMENTS 4,651,524 A * 3/1987 Brighton ................. F01N 3/032 60/303
4,976,929 A 12/1990 Cornelison et al.
(Continued)

FOREIGN PATENT DOCUMENTS

EP 0 590 699 A1 4/1994
WO WO-2011101896 A1 * 8/2011 ............. F01N 3/103

OTHER PUBLICATIONS

Machine Translation of WO 2011101896 A1 (Year: 2011).*
(Continued)

*Primary Examiner* — Brandon D Lee
(74) *Attorney, Agent, or Firm* — Osha Bergman Watanabe & Burton LLP

(57) ABSTRACT

A system for reducing internal combustion engine emissions includes an engine, a catalytic converter fluidly connected to a combustion chamber via an exhaust line, a glow plug positioned along the exhaust line between the catalytic converter and the combustion chamber, and a flame accelerator, without a fluid connection to a separate fuel supply. Methods of using the system include igniting a mixture of air and fuel in the exhaust line using the glow plug, producing an amount of heated combustion gas.

11 Claims, 6 Drawing Sheets

(51) Int. Cl.

| | |
|---|---|
| ***F01N 3/26*** | (2006.01) |
| ***F01N 3/28*** | (2006.01) |
| ***F02B 37/00*** | (2006.01) |
| ***F02D 41/02*** | (2006.01) |
| ***F02P 5/15*** | (2006.01) |
| ***F23M 9/00*** | (2006.01) |
| ***F23Q 7/00*** | (2006.01) |

(52) U.S. Cl.
CPC ............ *F02P 5/1504* (2013.01); *F01N 3/025* (2013.01); *F01N 3/0253* (2013.01); *F01N 3/0256* (2013.01); *F01N 3/26* (2013.01); *F01N 2240/14* (2013.01); *F02B 37/00* (2013.01); *F23M 9/00* (2013.01); *F23Q 7/00* (2013.01)

(58) Field of Classification Search
CPC F01N 2240/14; F02D 41/0255; F02P 5/1504; F02B 37/00; F23M 9/00; F23Q 7/00
See application file for complete search history.

(56) References Cited

U.S. PATENT DOCUMENTS

| | | | |
|---|---|---|---|
| 5,207,058 | A * | 5/1993 | Sasaki .................. F02B 23/104 60/284 |
| 5,277,025 | A | 1/1994 | Gonze et al. |
| 5,357,749 | A | 10/1994 | Ohsuga et al. |
| 5,425,233 | A * | 6/1995 | Ma ...................... F01N 13/0097 60/307 |
| 5,609,021 | A | 3/1997 | Ma |
| 5,685,144 | A | 11/1997 | Ma |
| 5,996,338 | A | 12/1999 | Hirota |
| 6,023,929 | A | 2/2000 | Ma |
| 6,481,200 | B1 * | 11/2002 | Hirota .................... F01N 3/035 60/284 |
| 7,735,315 | B2 | 6/2010 | Bareis et al. |
| 8,209,971 | B2 | 7/2012 | Kalantarifiroozabad et al. |
| 8,464,516 | B2 * | 6/2013 | Bell .......................... F01N 3/36 60/299 |
| 9,016,051 | B2 | 4/2015 | Iwasaki |
| 9,297,320 | B2 | 3/2016 | Hilditch et al. |
| 9,393,524 | B2 | 7/2016 | Naito et al. |
| 9,416,704 | B2 | 8/2016 | Tamaki et al. |
| 10,563,605 | B2 | 2/2020 | Dudar |
| 11,466,633 | B1 | 10/2022 | Martz et al. |
| 11,905,900 | B1 * | 2/2024 | Baur ..................... F01N 3/2013 |
| 2002/0023429 | A1 | 2/2002 | Kuper et al. |
| 2002/0035831 | A1 | 3/2002 | Huynh et al. |
| 2003/0014966 | A1 | 1/2003 | Hirota et al. |
| 2013/0047607 | A1 | 2/2013 | Petrovic et al. |
| 2016/0272189 | A1 | 9/2016 | Inoue et al. |
| 2017/0306898 | A1 * | 10/2017 | Kim ........................ F02D 23/00 |
| 2020/0232359 | A1 | 7/2020 | Kaack et al. |
| 2021/0396391 | A1 | 12/2021 | Carpenter et al. |

OTHER PUBLICATIONS

International Search Report issued for corresponding international patent application No. PCT/US2023/084082, mailed Mar. 25, 2024 (6 pages).
Written Opinion issued for corresponding international patent application No. PCT/US2023/084082, mailed Mar. 25, 2024 (8 pages).
Kim, Duk-Sang et al., "Development of the Unburned Exhaust Gas Ignition (UEGI) Technology to Achieve Fast Light-Off of Catalysts and Emissions Reduction"; SAE Transactions; vol. 111, Section 4: Journal of Fuels and Lubricants; pp. 2063-2070; 2002 (10 pages).

* cited by examiner

RAPID EXHAUST CATALYST HEATING USING A GLOW PLUG

BACKGROUND

Internal combustion engines emit gaseous pollutants such as carbon monoxide (CO), carbon dioxide ($CO_2$), unburned hydrocarbons, nitrogen oxide ($NO_x$) as well as solid pollutants such as particulate matter. As legislation has tightened the rules for vehicle emissions, new exhaust purification systems have been developed to reduce emissions. Most of the exhaust lines for internal combustion engines include one or more catalysts to reduce gaseous pollutants. Environmental concerns and government regulations have led to efforts focused on improving the removal of combustion by-products and exhaust pollutants from vehicle engine exhaust gases. Common exhaust lines are equipped with several components in order to reduce pollutants from the high concentrations observed directly from the engine to low concentrations at the tailpipe.

A large portion of the exhaust emissions are produced during the cold start phase, resulting from the low conversion efficiency of many exhaust gas purifying catalysts in cold engine conditions. As such, catalysts are often heated during the cold start phase to increase pollutant conversion and reduce noxious emissions. Nevertheless, under cold start conditions, residual pollutants often remain.

Accordingly, there exists a need for a system to assist in activating the catalyst during the cold start phase for internal combustion engines.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a system for reducing internal combustion engine emissions including an internal combustion engine with at least one combustion chamber and an engine fuel supply fluidly connected to the combustion chamber(s). The system further includes a catalytic converted fluidly connected to the combustion chamber(s) via an exhaust line, a glow plug positioned along the exhaust line between the catalytic converter and the combustion chamber, and a flame accelerator positioned along the exhaust line downstream of the glow plug and upstream of the catalytic converter. The exhaust line does not have a fluid connection to a fuel supply separate from the combustion chamber(s).

In another aspect, embodiments disclosed herein relate to a method for operating an internal combustion engine having at least one cylinder by injecting a fuel stream and an air stream into a combustion chamber in each of the cylinder(s) to form a mixture of air and fuel, directing the mixture of air and fuel to an exhaust line, igniting the mixture of air and fuel in the exhaust line using a glow plug, producing an amount of heated combustion gas, and flowing the amount of heated combustion gas through a flame accelerator to a catalytic converter to heat and activate a catalyst within the catalytic converter.

In another aspect, embodiments disclosed herein relate to a method for operating an internal combustion engine having at least one cylinder including providing an internal combustion engine with at least one combustion cylinder, directing a mixture of air and fuel from the at least one combustion chamber to an exhaust line, using a glow plug positioned in the exhaust line to ignite the mixture of air and fuel, thereby generating a combustion gas in the exhaust line, directing the combustion gas to a catalytic converter, and heating a catalyst in the catalytic converter using the combustion gas.

Other aspects and advantages of the claimed subject matter will be apparent from the following description and the appended claims.

DETAILED DESCRIPTION

In one aspect, embodiments disclosed herein relate to a system for reducing internal combustion engine emissions. In another aspect, embodiments disclosed herein relate to methods for operating an internal combustion engine with reduced emissions that include igniting a mixture of air and fuel in the engine's exhaust line using a glow plug prior to being directed into a catalytic converter. In another aspect, embodiments disclosed herein relate to methods for operating an internal combustion engine with reduced emissions that include using a glow plug in combination with a flame accelerator to flow heated combustion gas through a catalytic converter.

Figure 1:
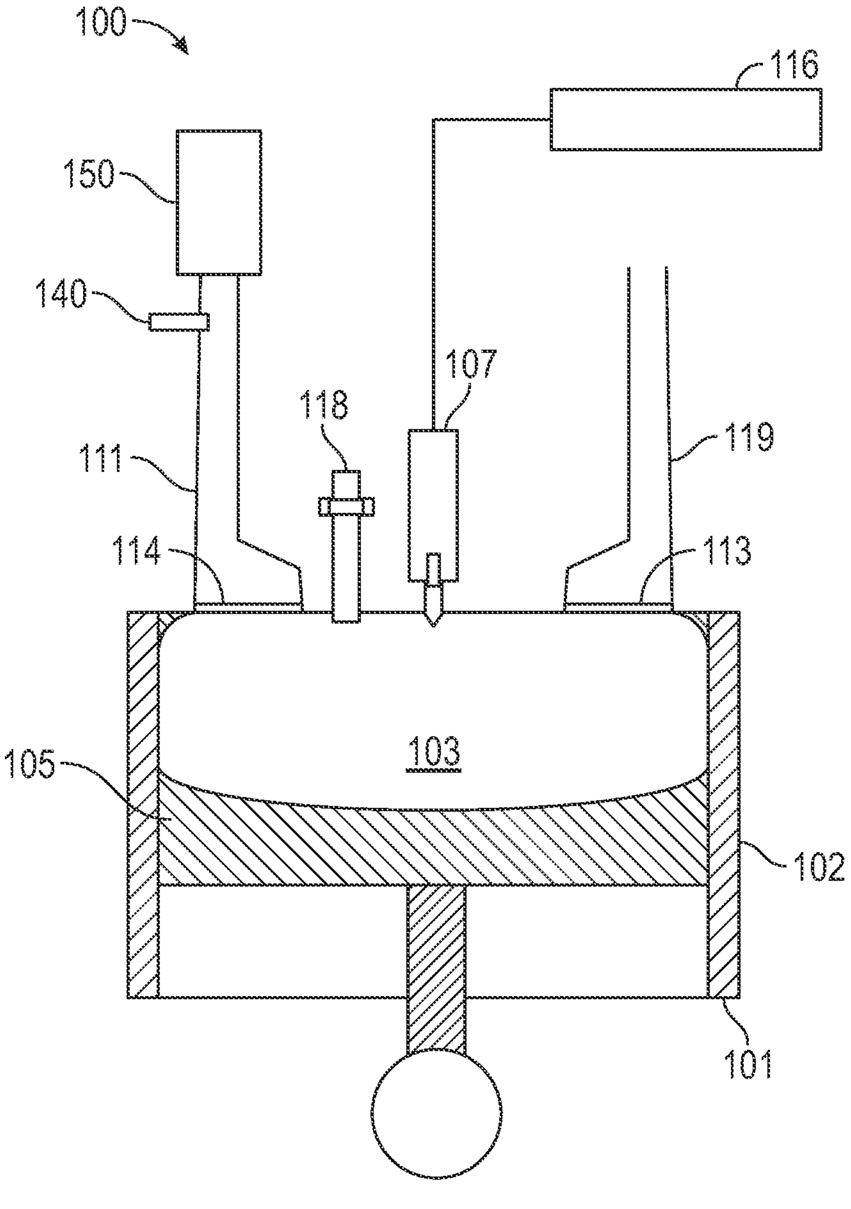
FIG. 1 shows an internal combustion engine with an exhaust line, glow plug, and catalytic converter in accordance with one or more embodiments.
Figure 2:
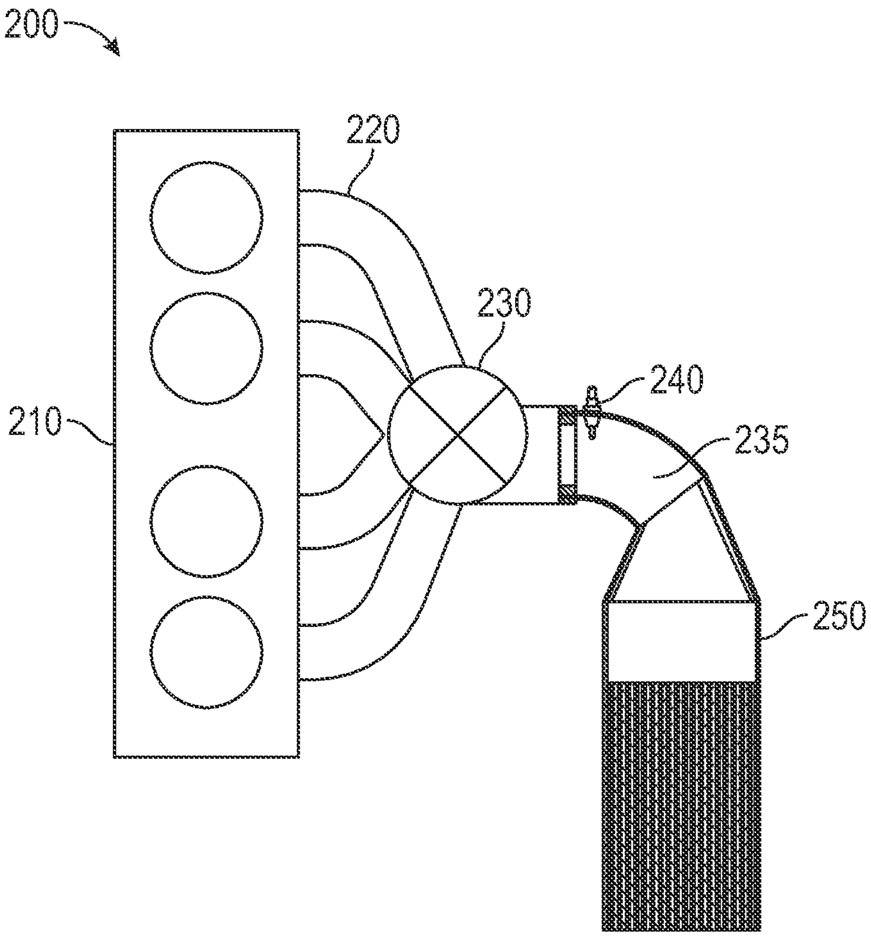
FIG. 2 shows an internal combustion engine with a turbocharger and glow plug in accordance with one or more embodiments.
Figure 3:
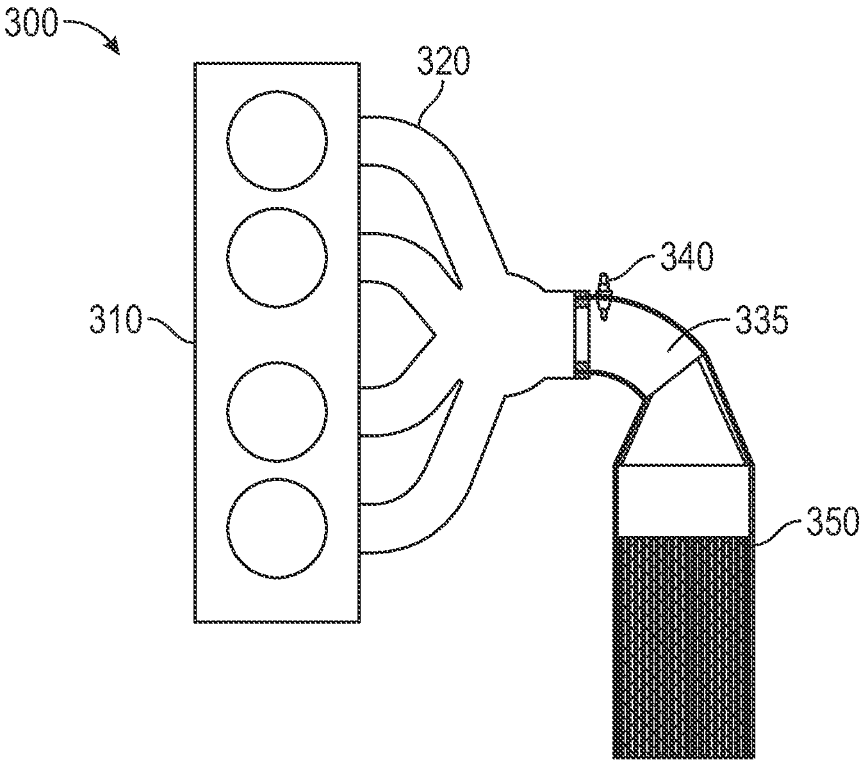
FIG. 3 shows an internal combustion engine with a glow plug and without a turbocharger in accordance with one or more embodiments.

An example of an internal combustion engine according to embodiments of the present disclosure is shown in FIG. 1, where the engine 100 includes a cylinder 101. One cylinder is shown in FIG. 1, however, engines according to embodiments of the present disclosure may include more than one cylinder (e.g., as shown in FIGS. 2 and 3). In many automotive applications, a vehicle may contain between 4 to 12 cylinders, though more or less is possible. Each cylinder 101 contains a piston 105 slidably positioned therein and a combustion chamber 103 defined within the cylinder between the piston head and the cylinder head. Thus, as the piston 105 moves axially back and forth in the cylinder, from a top dead center position to a bottom dead center position, the size of the combustion chamber 103 changes correspondingly.

A fuel supply and an air supply are fluidly connected to each combustion chamber 103 to provide the necessary components for combustion to occur. Air may be supplied to each combustion chamber 103 through one or more intake lines 119 (e.g., an intake manifold) and intake port(s) through the cylinder, where an intake valve 113 positioned in each intake port is open/closed to selectively allow air into the combustion chamber 103 at selected times. Fuel may be supplied to the combustion chamber via a fuel injector 107, which may be connected, for example, to the cylinder head, such as shown in FIG. 1. The piston 105 may move in the cylinder (via rotation of a connected crankshaft) in a four-stroke cycle, including an intake stroke, a compression stroke, an expansion stroke, and an exhaust stroke. During the intake stroke, the piston moves in a direction from top dead center (closer to the cylinder head) to bottom dead center (closer to the crankshaft), during which air may flow into the combustion chamber 103 via the intake valve(s) 113. During the compression stroke, the piston 105 moves in an opposite axial direction. Fuel may be injected into the combustion chamber 103 during the intake stroke or the expansion stroke. As the piston 105 moves in the cylinder, the piston 105 compresses and mixes the fuel and air mixture in the combustion chamber 103. The compressed fuel and air mixture may then be ignited (e.g., by a spark plug or by compression), thereby combusting the fuel. The combustion may power the expansion stroke of the piston 105, moving the piston 105 in the direction from top dead center to bottom dead center. The piston 105 may then move in the opposite axial direction for the exhaust stroke, during which the combustion exhaust is pushed out of the exhaust valve(s) 114 through the exhaust line(s) 111.

Both a compression ignition (CI) engine and a spark ignition (SI) engine may be used in this application. In a compression ignition engine, fuel and air are compressed under high pressure conditions without an additional ignition source in the combustion process. An example of a common compression ignition engine is a diesel engine. In a spark ignition engine, fuel and air are ignited with a spark plug. When a spark ignition engine is used, at least one spark plug will be present in each cylinder.

The combustion chamber 103 is fluidly connected to a single catalytic converter 150 via an exhaust line 111. In embodiments with multiple combustion chambers (in multi-cylinder engines), the exhaust of each of the combustion chambers flows through an exhaust manifold that converges into a single exhaust line routing the exhaust emissions towards the catalytic converter (shown in FIGS. 2 and 3). In some embodiments, the exhaust line 111 and the catalytic converter 150 may be a single, integrated piece. In other embodiments, the exhaust line 111 and the catalytic converter 150 may be separate units attached to each other to allow for fluid communication. A glow plug 140 is situated in the single exhaust line between the catalytic converter and the combustion chambers.

A catalytic converter converts harmful compounds, such as hydrocarbons, carbon monoxide, and nitrogen oxides, into inert gases including water vapor, carbon dioxide, and nitrogen. Catalysts have an activation temperature at which they effectively can convert the harmful emissions into inert gases. The activation temperature of the catalyst may be referred to as "light-off temperature." Typically, the activation temperature may be in the range of 250 to 350° C. During the cold start phase of the engine operation, the engine is producing exhaust emissions that are not yet heated to a temperature above the light-off temperature. In a conventional system, these exhaust emissions pass through the catalytic converter without being converted into inert gases, thus emitting harmful compounds into the environment. Systems and methods according to embodiments of the present disclosure may provide heat to the exhaust emissions using the glow plug to activate the catalyst during the cold start phase of the engine when the temperature of the exhaust emissions exiting the combustion chambers is not high enough to activate the catalyst.

In some embodiments, systems may further include a turbocharger situated between the combustion chambers and the glow plug. In general, a turbocharger is used to improve engine efficiency by increasing airflow to the engine and in turn allowing the engine to produce more power per combustion cycle. While the turbocharger may improve the efficiency of the engine in producing more power, the turbocharger may negatively impact the performance of the catalytic converter by acting as a cold metal sink to the exhaust emissions, making the placement of the glow plug immediately following the turbocharger highly effective in preventing heat loss from combustion gas to the turbocharger. By positioning the glow plug immediately after the turbocharger, the heat of the glow plug partially negates the cold metal sink, assisting in heating the catalyst to the light-off temperature. For example, in one or more embodiments, a glow plug may be positioned in the exhaust line within 10 inches of a turbocharger, e.g., between 2 and 6 inches.

In some embodiments, the system may further include a flame accelerator positioned in the exhaust line, downstream of the glow plug and upstream of the catalytic converter. The flame accelerator maintains a stable flame from the point that the ignition occurs in the vicinity of the glow plug to before the inlet face of the front catalyst substrate. The distance from the glow plug to the flame accelerator may be determined based on the balance of heat losses in the system. The flame accelerator may have a substrate or a matrix of metal with different geometries for generating additional turbulence, which further accelerates the flame propagation and improves the combustion completeness.

The flame accelerator may be sized to fit the exhaust line of the exhaust treatment system. In one or more embodiments, the flame accelerator is designed to minimally impact peak exhaust flow during peak power operation. The flame accelerator may contain different shapes of cross-sectional components. In some embodiments, the shapes may be rectangular. In other embodiments, the shapes may be circular. In other embodiments, the shapes may be triangular. The surface area of these cross-sectional components determines the blockage ratio of the flame accelerator. The blockage percentage may range between 2 and 25%. The blockage ratio impacts the system by generating turbulence in order to accelerate and/or complete the combustion of unburned exhaust gases prior to reaching the inlet face of the catalyst, while also impacting the system backpressure and hence engine performance adversely. The flame accelerator may be made of various materials including metal, ceramic, and/or graphene. Non-limiting examples of materials that the flame accelerator may be made from include a material selected from the group consisting of aluminum, stainless steel, iron, and combinations thereof.

The glow plug is situated between the internal combustion engine and the catalytic converter, allowing it to interact with the majority, if not all, of the internal combustion engine exhaust emissions. The glow plug may extend from an interior wall of the exhaust line into the flow passage through the exhaust line, such that a heated end of the glow plug intercepts gases flowing through the exhaust line. In some embodiments, the distance the glow plug may extend into the exhaust line between 5% and 95% of the overall diameter of the exhaust line. In some embodiments, a glow plug may extend through a wall of the exhaust line, such that a heated end of the glow plug extends a distance into the exhaust line, while a connection end of the glow plug is accessible outside of the exhaust line. In such embodiments, the glow plug may be electrically connected to a power source via the connection end. In some embodiments, the glow plug may be removable, e.g., for repair or replacement, by pulling the connection end of the glow plug to pull the glow plug out of the exhaust line. Whether the glow plug is fixedly connected to the exhaust line or removably connected to the exhaust line, the interface between the glow plug and exhaust line may be a fluid tight interface (e.g., using a seal) to prevent gases flowing through the exhaust line from escaping.

As a fluid (e.g., exhaust gases) flows through the exhaust line, the glow plug (when activated) may heat the fluid to a combustion temperature to ignite and combust the fluid flowing therethrough. Combustible fluids, such as fuel or combustible gas(es), may be provided through the exhaust line to the glow plug directly from the connected combustion chamber rather than from a separate fuel source.

For example, referring back to FIG. 1, the system does not contain an additional fuel supply to the glow plug that is separate from the fuel supply 116 to the combustion chamber 103. Instead, by controlling the fuel/air mixture in the combustion chamber and/or combustion of fuel within the combustion chamber, fuel may be supplied directly from the combustion chamber 103 to the glow plug 140 via the exhaust line 111 (and in some embodiments, through fluidly connected components such as an exhaust manifold and/or turbocharger, as discussed more herein). In some embodiments, the fuel supplied to the combustion chamber 103 through the fuel injector 107 may be supplied to the glow plug 140 based on the operation of the spark plug 118 in the combustion chamber 103, where deactivation of the spark plug 118 may allow for non-ignited fuel from the fuel injector 107 to flow from the combustion chamber 103 to the fluidly connected exhaust line 111 containing the glow plug 140. For example, when the spark plug 118 is activated, exhaust emissions are discharged from the combustion chamber 103 during the exhaust stroke through the exhaust line 111, toward the glow plug 140 and catalytic converter 150. When the spark plug 118 is not activated (i.e., is not operated to generate a spark), a non-combusted fuel and air mixture in the combustion chamber 103 may be discharged during the exhaust stroke through the exhaust line 111 toward the glow plug 140 and catalytic converter 150. In multi-cylinder engine embodiments, spark plugs may be activated in one or more of the cylinders and deactivated in one or more other cylinders within the same system, where fuel may be supplied to the glow plug from the deactivated cylinder(s) (from non-combusted fuel in the deactivated cylinders). This is discussed in greater detail in FIG. 9 below.

As fluid containing fuel or combustible gas is flowed through the exhaust line 111 to the glow plug 140, the glow plug 140 may be activated (heated) to an ignition temperature, such that the heated glow plug 140 may ignite combustible fluid flowing through the exhaust line 111 past the heated glow plug 140. In such manner, the glow plug 140 may ignite and combust combustible fluid in the exhaust line 111, thereby generating additional heat in the exhaust line 111. The combusted and heated gases from ignition by the glow plug 140 may then be directed to the catalytic converter 150 to heat the catalyst to its activation temperature ("light-off temperature"). To ensure sufficient heat for catalyst activation is carried from the area around the glow plug 140 to the catalytic converter 150, the glow plug 140 may be positioned within a selected distance from the catalytic converter 150 to avoid detrimental heat loss between the glow plug and the catalytic converter. For example, in one or more embodiments, the glow plug 140 may be positioned within a range of 2 to 20 inches away from the inlet to the catalytic converter 150.

In some embodiments, there may be a flame holder upstream of the glow plug to reduce the immediate contact of cold exhaust emissions with the hot surface of a heated end of the glow plug. In one or more embodiments, a flame holder may be a plate of thermally conductive material that is positioned to act similar to a windshield to the glow plug. For example, the flame holder may be spaced apart from but close enough to the glow plug to conduct heat from the heated end of the glow plug. Additionally, the flame holder may be positioned upstream from and at least partially axially aligned with the glow plug in the exhaust line, such that fluid flowing through the exhaust line may be at least partially blocked from flowing directly onto the glow plug by the flame holder. In one or more embodiments, the flame holder may be located a distance ranging between 0.5 and 5 inches upstream from the glow plug. The flame holder may be a flat, cylindrical, or triangular shape with or without holes.

Referring now to FIG. 2, FIG. 2 shows an example of an internal combustion engine system 200 according to embodiments of the present disclosure that includes a turbocharger 230 and glow plug 240. The internal combustion engine 210 is fluidly connected to an engine fuel and air supply (e.g., via fuel injectors and an intake manifold). As shown in FIG. 2, in some embodiments, the internal combustion engine 210 produces exhaust emissions that flow through an exhaust manifold 220 to a turbocharger 230. The exhaust emissions exit the turbocharger 230 through an exhaust line 235 and are ignited by a glow plug 240, producing a heated combustion gas. The heated combustion gas flows to a catalytic converter 250 to heat and activate a catalyst within the catalytic converter 250.

FIG. 3 shows another example of an internal combustion engine according to embodiments of the present disclosure that includes a glow plug. The internal combustion engine 310 is fluidly connected to an engine fuel and air supply (not shown). The internal combustion engine 310 produces exhaust emissions that flow through an exhaust manifold 320 converging to a single exhaust line 335. The exhaust emissions are ignited by a glow plug 340, producing a heated combustion gas. The heated combustion gas flows to a catalytic converter 350 to heat and activate a catalyst within the catalytic converter 350. In the embodiment shown, the exhaust line 335 is connected directly to an exhaust manifold 320, without a turbocharger. In one or more embodiments, the exhaust line 335, a glow plug 340, and catalytic converter 350 may be provided together as an integrated assembly, where the assembly may be directly connected to the exhaust manifold outlet.

Figure 4:
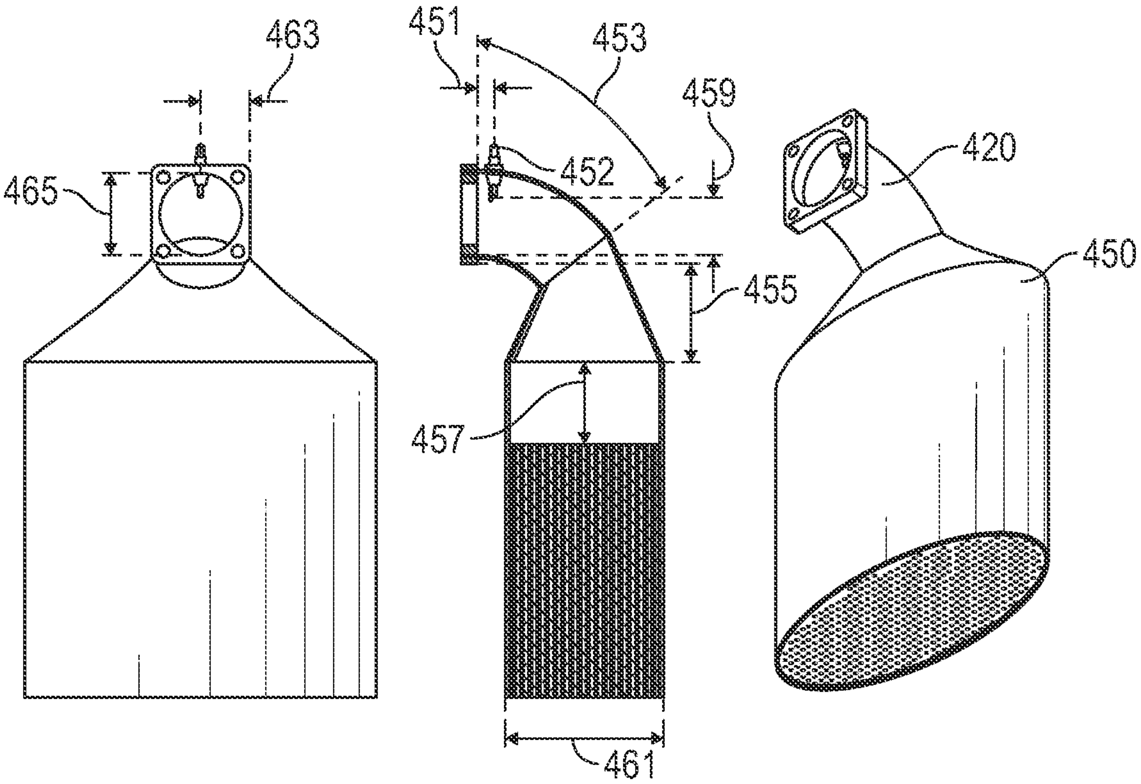
FIG. 4 shows, from left to right, a side view, a cross-sectional view, and a perspective view, of the geometry of an exhaust line and a catalytic converter in accordance with one or more embodiments.

For example, FIG. 4 shows the geometry of an assembly of an exhaust line 420, a glow plug 452, and a catalytic converter 450. In some embodiments, the exhaust line 420 containing the glow plug 452 and the catalytic converter 450 are a single piece 450. The geometry of the glow plug 452 location and the catalytic converter 450 varies based on the engine, the catalyst size, and the catalyst loading. The dimension 451 between the flange of the exhaust line 420 and the glow plug 452 controls the location of the glow plug relative to a connected exhaust manifold. The angle 453 controls the trajectory of the exhaust line 420 bend towards the catalytic converter 450. Dimension 455 controls the height of the catalyst inlet surface and the bottom of the exhaust pipe 420. Dimension 457 controls the distance between the catalyst cone to the catalyst inlet in the catalytic converter 450. Dimension 459 controls the protrusion of the glow plug relative to the exhaust line 420 diameter. Dimension 463 controls the location of the glow plug 452 relative to the sidewall of the exhaust line 420. Dimension 465 controls the diameter of the exhaust line 420 where the glow plug 452 is located. Dimension 461 controls the thickness of the oval catalyst brick within the catalytic converter 450.

Figure 5:
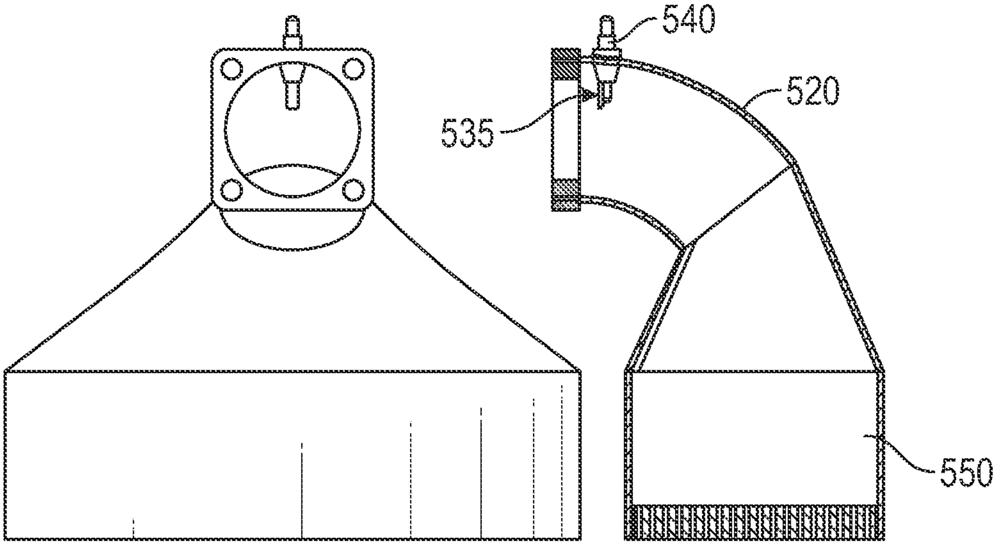
FIG. 5 shows a side view and a cross-sectional view of an exhaust line with a flame holder, a glow plug, and a catalytic converter in accordance with one or more embodiments.

FIG. 5 shows an illustration of an exhaust line 520 with a glow plug 540, a flame holder 535, and a catalytic converter 550. In some embodiments, there may be a flame holder 535 upstream of the glow plug 540 to reduce the immediate contact of the cold exhaust emissions with the hot surface of the glow plug 540. This contact, in the absence of a flame holder 535, may cause significant convective heat loss that may lower the temperature of the glow plug 540 below the ignition temperature. By using a flame holder 535, the glow plug 540 remains above the ignition temperature and can properly heat the exhaust emissions to activate the catalyst during the cold start phase.

Figure 6:
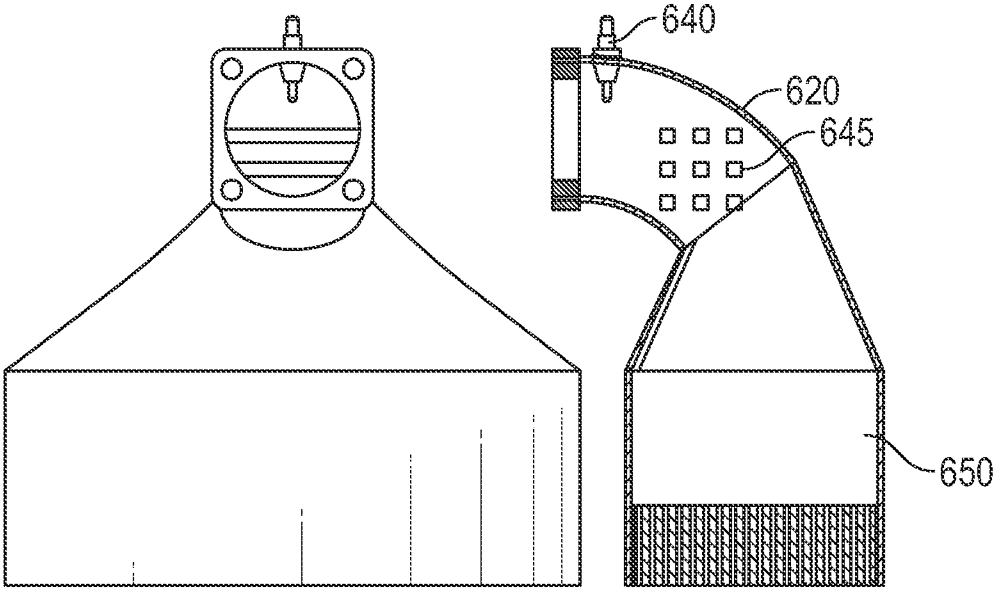
FIG. 6 shows a side view and a cross-sectional view of an exhaust line with a flame accelerator, a glow plug, and a catalytic converter in accordance with one or more embodiments.

FIG. 6 shows an illustration of an exhaust line 620 with a glow plug 640, a flame accelerator 645, and a catalytic converter 650. In some embodiments, a flame accelerator 645 may be present downstream of the glow plug 640. As shown in FIG. 6, a flame accelerator 645 may include multiple rectangular cross-sectional components that extend internally across the exhaust line 650, e.g., from one side of the inner surface of the exhaust line to an opposite side of the inner surface of the exhaust line.

Figure 7:
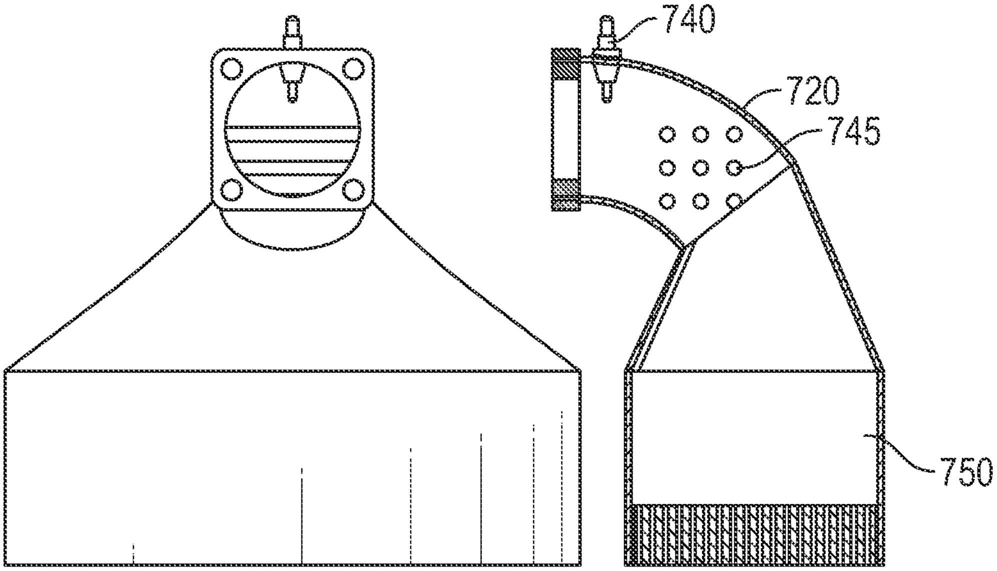
FIG. 7 shows a side view and a cross-sectional view of an exhaust line with a flame accelerator, a glow plug, and a catalytic converter in accordance with one or more embodiments.

In other embodiments, the flame accelerator may have circular cross-sectional components. FIG. 7 shows an illustration of an exhaust line 720 with a glow plug 740, a flame accelerator 745, and a catalytic converter 750. In FIG. 7, the flame accelerator 745 is situated downstream of the glow plug 740 and is illustrated with circular cross-sectional components that extend internally across the exhaust line 720.

Figure 8:
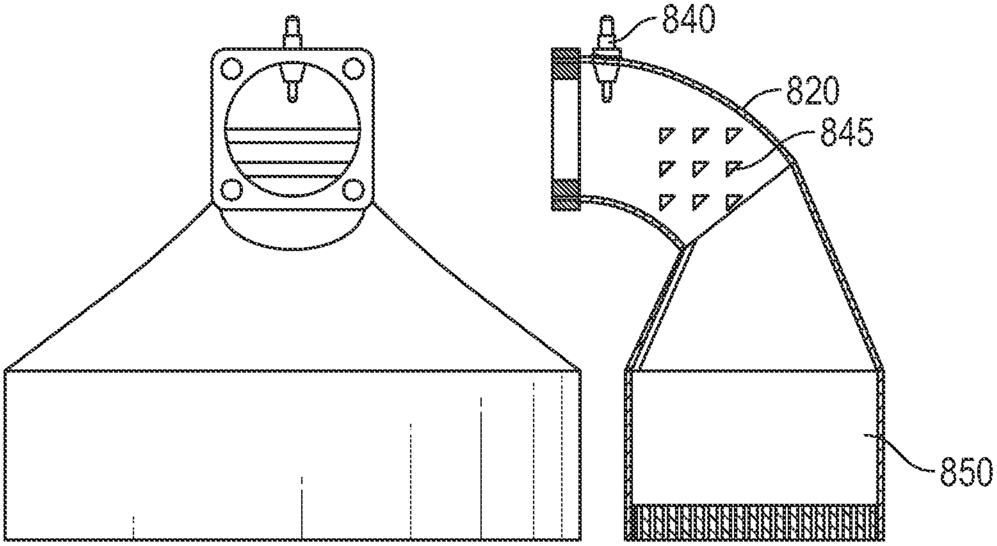
FIG. 8 shows a side view and a cross-sectional view of an exhaust line with a flame accelerator, a glow plug, and a catalytic converter in accordance with one or more embodiments.

In other embodiments, a flame accelerator 845 may have triangular cross-sectional components extending internally through the exhaust line. FIG. 8 shows an illustration of an exhaust line 820 with a glow plug 840, a flame accelerator 845, and a catalytic converter 850. In FIG. 8, the flame accelerator 845 is situated downstream of the glow plug 840 and is illustrated with triangular cross-sectional components.

According to embodiments of the present disclosure, an exhaust line to an internal combustion engine may be provided with a glow plug (and in some embodiments also a flame holder and/or a flame accelerator) in order to ignite combustible fluid within the exhaust to create heated combustion gas in relatively close proximity to a connected catalytic converter. In such manner, the heated combustion gas may be generated in the exhaust line in relatively close proximity to the connected catalytic converter to heat the catalyst in the catalytic converter during cold start conditions (e.g., when the engine is initially starting and has not warmed up). Additionally, rather than using an extra fuel source and/or extra fuel connections, combustible fluid may flow directly from one or more combustion chambers in the engine to the glow plug, e.g., via an exhaust manifold or exhaust line.

Figure 9:
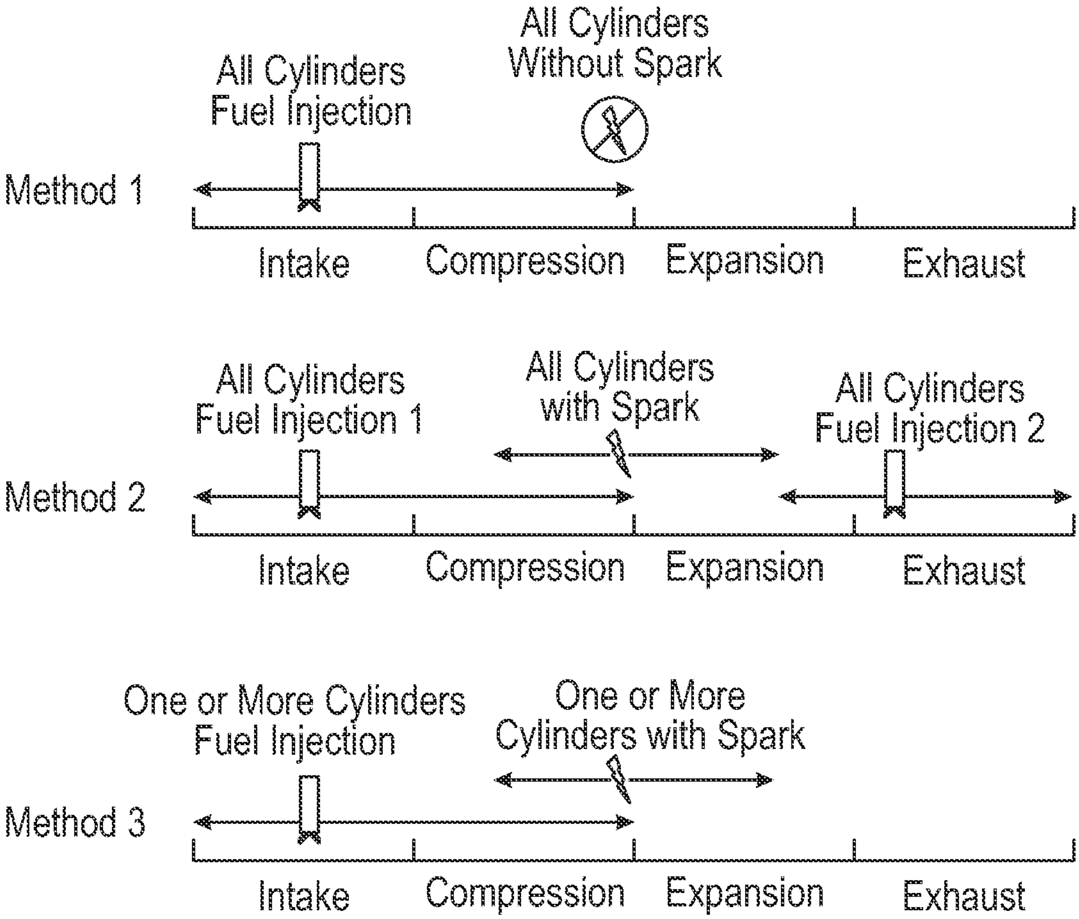
FIG. 9 shows methods for providing a mixture of air and fuel to an internal combustion engine in accordance with one or more embodiments.

FIG. 9 shows three methods according to embodiments of the present disclosure for providing combustible fluid (e.g., a mixture of air and fuel) through an internal combustion engine to a glow plug in an exhaust line from the engine. In each of the example methods, Method 1-3, a multi-cylinder engine includes a spark plug connected to each cylinder of the engine, where the spark plugs may be used to ignite combustible fluid within the cylinders' combustion chambers.

In Method 1, at a selected time during, e.g., during a cold start of the engine, all of the spark plugs in the internal combustion engine are deactivated. The activation/deactivation of the spark plugs may be controlled, for example, using an electric controller. As shown in the timing chart in FIG. 9, a fuel stream and an air stream are injected into the combustion chamber during an intake stroke of each cylinder's cycle. However, in Method 1, fuel may be injected into the combustion chamber at different times during the intake stroke and/or compression stroke of the piston, for example, at 30 degrees before firing Top Dead Center (TDC) during the intake stroke to 180 degrees after firing TDC during the expansion stroke. One of ordinary skill in the art may appreciate that injected air and fuel may contain various components (e.g., oxygen, nitrogen, carbon dioxide, water vapor, dust, etc.) which together form a combustible fluid having a majority gas phase. During the compression stroke of each cylinder's cycle, the injected air and fuel mixture in the combustion chamber is compressed. Without the spark plug to ignite the air and fuel mixture injected into the engine, the air and fuel mixture is maintained in the combustion chamber during the expansion stroke in each cylinder, after which, the air and fuel mixture passes from the combustion chamber into the exhaust line during the exhaust stroke of each cylinder's cycle without being combusted. The air and fuel mixture flows through the exhaust line and to the glow plug to provide the necessary components for ignition and combustion in the exhaust line.

In Method 2, all of the spark plugs in the internal combustion engine are activated during operation of the engine. As shown in the timing chart for Method 2 in FIG. 9, in each cylinder of the engine, a fuel stream (e.g., from a fuel injector connected to the cylinder head) and an air stream (e.g., provided from a connected intake line) is injected into the combustion chamber during the intake stroke of the piston. However, in Method 2, fuel may be injected into the combustion chamber at different times during the intake stroke and/or compression stroke of the piston according to embodiments of the present disclosure. During the compression stroke of each cylinder's cycle, the injected air and fuel mixture in the combustion chamber is compressed. As the piston nears the top dead center position, the air and fuel mixture is ignited by activation of the connected spark plug. One of ordinary skill in the art may appreciate that the ignition timing to each cylinder may be selected based on engine operation parameters. Ignition and combustion of the air and fuel mixture provides power to the expansion stroke in the cylinder's cycle, where the combusted air and fuel mixture is directed out of the combustion chamber to an exhaust line during an exhaust stroke of the cylinder's cycle. In Method 2, a second injection of fuel may be injected into the combustion chamber during the end half of the expansion stroke and/or during the exhaust stroke (e.g., at the beginning of the exhaust stroke, as shown in the timing chart for Method 2 in FIG. 9), for example, between 0 to 180 degrees after firing TDC. This second injection of fuel provides a fuel rich combusted air and fuel mixture exhausted from the combustion chamber to the exhaust line to supply the glow plug with a combustible fluid for ignition.

In Method 3, one or more of the spark plugs are deactivated and one or more spark plugs are activated at a selected time during operation of the internal combustion engine (e.g., during cold start of the engine). For example, during a period of time while operating the engine, half of the cylinders in the multi-cylinder engine may have deactivated spark plugs, while the remaining cylinders of the multi-cylinder engine may have activated spark plugs. As shown in the timing chart of Method 3 in FIG. 9, a fuel stream and an air stream are injected into each combustion chamber during an intake stroke of each cylinder's cycle. However, in one or more embodiments, Method 3 may include injecting fuel into the combustion chamber at different times during the intake stroke and/or the compression stroke. The air and fuel mixture are compressed within the combustion chamber during the compression stroke of each cylinder's cycle. The cylinders with deactivated spark plugs do not combust the air and fuel mixture, allowing the air and fuel mixture to exit the combustion chamber during the exhaust stroke and to flow to the exhaust line. The cylinders with activated spark plugs combust the air and fuel mixtures received in those cylinders, where the combusted air and fuel mixtures are directed out of the cylinders during the exhaust stroke and mix with the un-combusted air and fuel mixtures provided from the cylinder(s) with deactivated spark plugs to form a combustible fluid. The combustible fluid (provided from the exhaust (combusted and un-combusted) of all the cylinders) may be directed through an exhaust manifold to the glow plug provided in the connected exhaust line, where the glow plug ignites the combustible fluid. One of ordinary skill in the art may appreciate that different ratios of deactivated to activated cylinders may provide different ratios of fuel in the combustible fluid (e.g., a fuel rich combustible fluid may be provided by deactivating a relatively higher number of the cylinders, and a fuel lean combustible fluid may be provided by deactivating a relatively smaller number of the cylinders).

As previously discussed, when operating a multi-cylinder engine having multiple combustion chambers, an exhaust manifold may direct the exhaust emissions from each combustion chamber and then converge into a single exhaust line. In some embodiments, the mixture of air and fuel flows through a turbocharger before being directed to the exhaust line. In some embodiments, the mixture of air and fuel flows past a flame holder in the exhaust line to reduce the immediate contact of the cold exhaust emissions with the hot surface of the glow plug, before flowing to the glow plug. In other embodiments, the mixture of air and fuel flows directly to the glow plug in the exhaust line. The mixture of air and fuel is ignited in the exhaust line by the glow plug, producing heated combustion gas. In some embodiments, there is a flame accelerator downstream of the glow plug to generate turbulence in order to accelerate and/or complete the combustion of unburned exhaust gases prior to reaching the inlet face of the catalyst. In other embodiments, the heated combustion gas flows through the exhaust line directly to the catalytic converter to heat and activate the catalyst within the catalytic converter, initiating the conversion of the harmful compounds in the heated combustion gas and exhaust emissions to inert gas.

Embodiments of the present disclosure may provide at least one of the following advantages. By including a glow plug, the mixture of air and fuel ignites and provides energy to the catalytic converter, to help reach catalyst light-off temperature sooner than in a conventional process. This ensures the catalytic converter begins trapping harmful emissions during the cold start phase. The use of a flame holder reduces the immediate contact of the cold exhaust gases with the hot surface of the glow plug, acting as a shield to prevent convective heat loss between the glow plug and the cold exhaust gases. In embodiments including a turbocharger, situating the glow plug immediately after the turbocharger helps to negate heat losses to the turbocharger.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed:

1. A system for reducing internal combustion engine emissions, comprising:
- an internal combustion engine comprising:
  - at least one combustion chamber; and
  - an engine fuel supply fluidly connected to the at least one combustion chamber;
- a catalytic converter fluidly connected to the at least one combustion chamber via an exhaust line;
- a glow plug positioned along the exhaust line between the catalytic converter and the combustion chamber; and
- a flame accelerator positioned along the exhaust line downstream of the glow plug and upstream of the catalytic converter;
- wherein the flame accelerator has a matrix of metal for generating additional turbulence;
- wherein the exhaust line does not have a fluid connection to a fuel supply separate from the engine fuel supply connected to the at least one combustion chamber.

2. The system of claim 1, further comprising a flame holder positioned within the exhaust line upstream of the glow plug and downstream of the at least one combustion chamber.

3. The system of claim 1, wherein the flame accelerator comprises a plurality of cross-sectional components that extend internally across the exhaust line, from one side of the exhaust line to an opposite side of the exhaust line, providing a blockage ratio ranging between 2 and 25%.

4. The system of claim 3, wherein the plurality of cross-sectional components is selected from the group consisting of rectangular, circular, and triangular components.

5. The system of claim 1, wherein the flame accelerator is made of a material selected from the group consisting of metal, ceramic, and graphene.

6. The system of claim 1, further comprising a turbocharger fluidly connected to the exhaust line and positioned downstream of the internal combustion engine and upstream of the glow plug.

7. The system of claim 6, wherein an exhaust manifold is connected between an inlet to the turbocharger and the at least one combustion chambers.

8. The system of claim 1, wherein the exhaust line and the catalytic converter are integrated as a single piece of equipment.

9. The system of claim 1, wherein the glow plug extends through a wall of the exhaust line, such that a heated end of the glow plug extends an extension distance from the into the exhaust line, the extension distance ranging from 5 to 95 percent of a diameter of a portion of the exhaust line in which the glow plug is positioned.

10. The system of claim 1, wherein the glow plug is positioned a distance from an inlet to the catalytic converter ranging from 2 to 20 inches.

11. The system of claim 6, wherein the glow plug is positioned in the exhaust line between 2 and 6 inches away from the turbocharger.

* * * * *